May 20, 1941.  A. C. WHITTLESEY  2,242,734
HYDRAULIC CLUTCH
Filed Jan. 8, 1940

INVENTOR.
AUSTIN C. WHITTLESEY
BY W. A. Beatty
ATTORNEY.

Patented May 20, 1941

2,242,734

UNITED STATES PATENT OFFICE 2,242,734

HYDRAULIC CLUTCH

Austin C. Whittlesey, Pasadena, Calif.

Application January 8, 1940, Serial No. 312,955

7 Claims. (Cl. 192—58)

The invention relates to a hydraulic clutch employing a positive rotary oil pump, the discharge from which is through small ports just large enough to allow the oil to flow freely at the idling speed of the engine. As the engine is accelerated more oil is pumped which must flow through the same small ports, creating a back pressure which is a resistance to the action of the pump, and, which in consequence, develops a torque. When the car has attained some predetermined speed, e. g. corresponding to 15 or 20 miles an hour in high gear, centrifugally controlled valves close the discharge ports and, since no oil can then escape from the pump, no relative movement between the driving and driven elements is possible (except a very small amount due to oil leakage) providing a positive drive through an oil cushion at all medium and high speeds of the car.

Objects of the invention are to simplify and improve the fluid circuit for the clutch, to improve the seal between the rotor and stator, to simplify the seal for the centrifugally controlled valves, to prevent reversal of the direction of rotation of the clutch, and to simplify and improve the clutch generally.

For further details of the invention reference may be made to the drawing wherein Fig. 1 is a vertical sectional view on lines 1—1 of Fig. 2, looking in the direction of the arrows.

Figure 1:
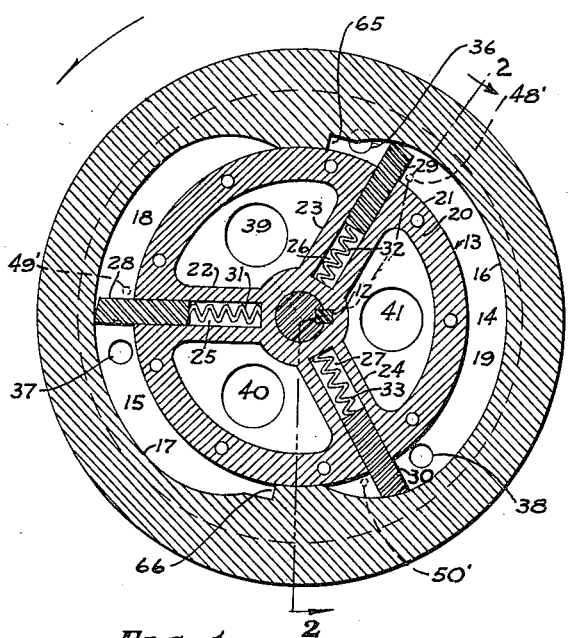

Referring to the drawing, the rotatable casing 1 is adapted to contain a fluid, such as oil, and comprises a ring 2 to which is secured end plates 3 and 4 by means of bolts such as 5 and 6 respectively. Secured to end plate 3 by bolts such as 7 is a hub 8 which is adapted to be secured, in a conventional manner, to the crank shaft of the engine of an automobile. End plates 3 and 4 have aligned bearings 9 and 10 respectively in which is rotatably mounted a shaft 11 which is adapted to be secured to the transmission of the automobile. Secured to shaft 11 by key 12 is the rotor 13. Key 12 permits rotor 13 to slide axially on shaft 11 in order to permit rotor 13 to be properly aligned with the casing ring 2.

Ring 2 has a pair of circumferentially spaced eccentric grooves or recesses 14 and 15, as shown in Fig. 1, the corresponding inner faces 16 and 17 of the ring 2 forming the outer walls of the pump chambers 18 and 19 respectively.

Figure 2:
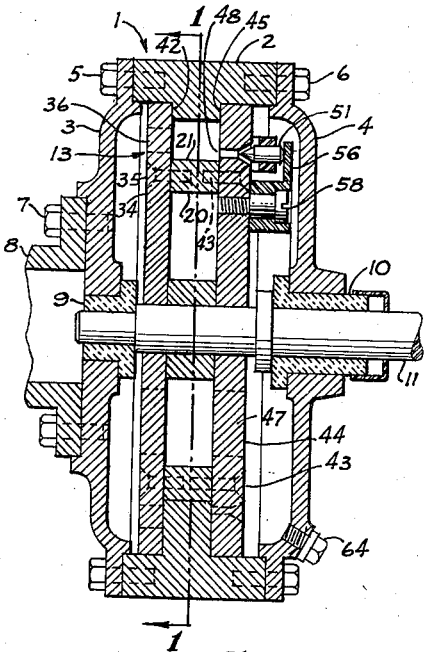
Fig. 2 is a sectional view on lines 2—2 of Fig. 1, looking in the direction of the arrows.

The rotor 13 comprises a rotor ring 20 having a circular periphery 21 which forms the inner walls of the pump chambers 18 and 19. The ring 20 has three arms or spokes 22, 23, and 24 each of which has a radial recess 25, 26, and 27 respectively and in each such recess is mounted a vane 28, 29, and 30 respectively, urged outwardly by springs 31, 32, and 33 respectively. Each of the vanes 28, 29, and 30 is of the same width as the width of the pump chambers 18 and 19. To the left side of rotor ring 20, as shown in Fig. 2, is a disc 34 secured thereto by bolts such as 35. Disc 34 forms one side wall of the pump chambers 18 and 19 and has three equally spaced inlet ports 36, 37, and 38 arranged on the leading side of their respective vanes 29, 28, and 30. Between the arms or spokes 22, 23, and 24 are provided ports 39, 40 and 41 which permit the oil or other fluid to flow to the left as seen in Fig. 2, to the fluid chamber of which a side wall is formed by end plate 3 so that this oil may enter the inlet ports 36, 37, and 38 leading to the pump chambers 18 and 19. Disc 34 has radial sealing contact and also peripheral contact with the casing ring 2 by reason of the fact that the periphery of this disc 34 is fitted to the inside of ring 2, and by reason of the fact that the right hand side of disc 34 as seen in Fig. 2 bears against the flat circular bearing surface 42 on the ring 2. Secured to the right hand side of rotor ring 20, as seen in Fig. 2, by means of bolts such as 43 is a circular disc 44 which forms the right hand side wall of the pump chambers 18 and 19. Disc 44 also has peripheral and radial sealing contact with the casing ring 2 in the same manner as above described for disc 34, namely the periphery of disc 44 has a bearing contact with the inner surface of casing ring 2, and the left side of disc 44 has sliding engagement with the flat annular surface 45 on the ring 2. The casing ring 2, the rotor ring 20 and the discs 34 and 44 form walls of the pump chambers 18 and 19.

Figure 3:
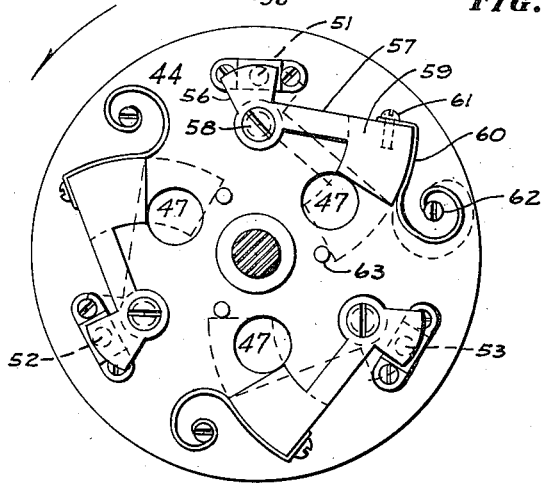
Fig. 3 is a plan view of the right hand side of the rotor of Fig. 2.

Disc 44 has three ports of the same size and directly opposite the ports 39, 40 and 41 one of these ports being illustrated on dotted lines at 47 in Fig. 2, and all of them showing in Fig. 3. The ports 47 permit the oil to flow from the right hand side of the casing 1 through disc 44, and it then flows through the ports 39, 40 and 41 to the left hand side thereof.

Disc 44 is provided with three equally spaced outlet ports, one of which is shown at 48 in Fig. 2, arranged on the opposite sides of the vanes 28, 29 and 30 from the inlet ports 36, 37 and 38. The position of the outlet port 48, with respect to the vane 29 and the inlet port 36, is illustrated by the broken circle 48' in Fig. 1. Similarly the broken circle 49' illustrates the relative position of a second outlet port similar to the outlet 48 and the broken circle 50', illustrates the relative position of the third outlet port like 48.

Figure 4:
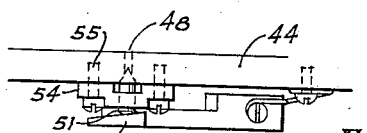
Fig. 4 is a detailed view of one of the valve operating mechanisms.

Each of the outlet ports like 48 is smaller than the corresponding inlet port 36, with the result that the casing 1 may rotate at a low speed without creating enough back pressure in the pump chambers 18 and 19 to cause rotation of shaft 11. When the speed of casing 1 is increased, enough back pressure is created in the pump chambers 18 and 19 to cause shaft 11 to rotate, and on further increase in speed of casing 1, and when the speed of shaft 11 and rotor 13 has reached a sufficiently high value, say above a speed corresponding to 15 or 20 miles an hour in high gear, the outlet ports like 48 are closed so that there is in effect a direct drive from casing 1 to shaft 11 through the fluid cushion enclosed in the compression side of the pump chambers 18 and 19. To this end, one of the outlet ports like 48 is provided with a centrifugally operated valve 51, shown in Figs. 2, 3, and 4. As shown in Fig. 3, equally spaced valves 52 and 53 are provided for the other two outlet ports like 48 in Fig. 2. Valve 51 is slidably mounted in a valve holder 54 which is secured to disc 44 by means of bolts such as 55. Valve 51 is operated on by a cam 56 on one end of a lever 57 which is pivotally mounted on a stud pin 58 mounted on disc 44. Lever 57 has a weighted arm 59 which moves outwardly and causes cam 56 to close valve 51 when disc 44 reaches a high speed as above described. The movement of weighted arm 59 outwardly may be resisted by a spring 60, one end of which is secured to arm 59, as shown in 61 and the other end to the stud 62 on disc 44, spring 60 tending to return arm 59 to its inwardly position against stop 63 as shown on dotted line in Fig. 3. The valves 52 and 53 have centrifugally operated mechanisms similar to that above described for valve 51.

The end plate 4 is provided with a plug 64 which serves as a drain plug when the casing 1 is in the position in Fig. 2, and as a filling plug when casing 1 is rotated so that plug 64 is on top.

When the car is climbing a hill, if the speed of the car slows down to a point where the weighted arms like 59 open the valves like 51, the clutch automatically begins to slip, allowing the engine to maintain a high speed. For this reason it would not be possible to stall the engine when this clutch is used.

Assuming the casing 1 is rotating in a counter-clockwise direction as seen in Fig. 1, the leading end of the pump chamber 19, in the ring 2, is formed with a radial shoulder or notch 65 which forms a stop against which the vane 29 abuts to prevent reversal of the direction of rotation of casing 1. Similarly the face 17 of the pump chamber 18 at its leading end, terminates in a shoulder or notch 66 to serve as a stop for one of the vanes 28, 29 and 30 to prevent reversal of rotation of the casing 1.

It will be apparent that the sealing problem for the centrifugally controlled valves 51, 52, and 53 has been substantially eliminated through mounting such mechanism inside of the casing 1. Also, it will be apparent that I have provided a fluid circuit which links with the rotor ring 20, the fluid encircling and linking with this ring, the pump chambers 18 and 19 being arranged at the outermost portion radially of this link circuit whereby centrifugal action would keep the pump chambers 18 and 19 full of oil even though there were some loss due to leakage, the loss appearing centrally of the casing 1 and not peripherally thereof where the pump chambers 18 and 19 are located.

I claim:

1. A hydraulic clutch comprising the combination of a rotatable casing having a ring with a plurality of circumferentially spaced eccentric grooves on the inner side thereof forming the outer walls of pump chambers, a rotor ring inside of said casing ring, the periphery of said rotor ring forming the inner wall of said pump chambers, a plurality of vanes on said rotor ring for said chambers, a disc fixed at each side of said rotor ring, said discs embracing said casing ring and forming the side walls of said pump chambers, inlet ports for said chambers in one of said discs, outlet ports for said chambers in the other of said discs, and means for controlling the discharge from said outlet ports.

2. A hydraulic clutch according to claim 1 wherein said discs have radial sealing contact with the opposite sides of said casing ring, a shaft for said rotor and means for slidably keying said rotor to said shaft to facilitate centering said casing ring between said discs.

3. A hydraulic clutch according to claim 1, wherein said controlling means comprises centrifugally controlled valve means for controlling said outlet ports.

4. A hydraulic clutch according to claim 1, wherein said controlling means comprises centrifugally controlled valves on said other of said discs for said outlet ports.

5. A hydraulic clutch according to claim 1, comprising notches in said casing ring and co-operating with said vanes to prevent reversal of the direction of rotation of said rotor.

6. A hydraulic clutch comprising the combination of a rotatable casing, a rotor therein, means providing a pump chamber between said casing and said rotor, an outlet port in said rotor for said pump chamber, said outlet port having such an area as to permit the fluid pumped by said casing to pass therethrough freely at idling speed of said casing and at higher speeds restricting the flow of oil and causing said rotor to rotate, and centrifugally controlled valve means on said rotor in said casing for closing said outlet port for positive drive of said rotor by said casing.

7. A hydraulic clutch comprising the combination of a casing ring having recessed portions forming outer walls of pump chambers, end plates secured to said ring and forming walls of a fluid chamber, a rotor forming the remaining walls of said pump chambers, ports in said rotor permitting fluid flow from one side of said rotor to the other, inlet ports in said rotor permitting fluid flow from one side of said rotor to said pump chambers, and outlet ports in said rotor permitting fluid flow from said pump chambers to the other side of said rotor.

AUSTIN C. WHITTLESEY.